(12) United States Patent
Berndl et al.

(10) Patent No.: US 9,923,427 B2
(45) Date of Patent: Mar. 20, 2018

(54) STATOR WITH PHASE INSULATION FOR AN ELECTRIC MACHINE AND PRODUCTION METHOD FOR SUCH A STATOR

(71) Applicant: Bayerische Motoren Werke Aktiengesellschaft, Munich (DE)

(72) Inventors: Juergen Berndl, Nandlstadt (DE); Paloma Monedero, Stuttgart (DE); Stephan Loistl, Woerthsee (DE); Dragoljub Duricic, Munich (DE); Marc Waeber, Langenthal (CH)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 22 days.

(21) Appl. No.: 14/743,177

(22) Filed: Jun. 18, 2015

(65) Prior Publication Data

US 2015/0288240 A1 Oct. 8, 2015

Related U.S. Application Data

(63) Continuation of application No. PCT/EP2013/073955, filed on Nov. 15, 2013.

(30) Foreign Application Priority Data

Dec. 19, 2012 (DE) .......................... 10 2012 223 668

(51) Int. Cl.
*H02K 3/38* (2006.01)
*H02K 3/30* (2006.01)
(Continued)

(52) U.S. Cl.
CPC ................. *H02K 3/38* (2013.01); *H02K 3/30* (2013.01); *H02K 3/34* (2013.01); *H02K 3/50* (2013.01);
(Continued)

(58) Field of Classification Search
CPC .. H02K 3/30; H02K 3/50; H02K 3/52; H02K 3/38; H02K 3/34; H02K 3/46; H02K 5/08; H02K 5/15; H02K 15/024; H02K 15/085; H02K 1/16; H02K 3/345; Y10T 29/49009
USPC .......................................... 310/43, 260, 194
See application file for complete search history.

(56) References Cited

U.S. PATENT DOCUMENTS

4,213,070 A  7/1980 Lund et al.
4,403,162 A  9/1983 Pallaro
(Continued)

FOREIGN PATENT DOCUMENTS

DE        288 940 A5   4/1991
DE  10 2005 002 364 A1  7/2006
(Continued)

OTHER PUBLICATIONS

International Search Report dated Mar. 19, 2014 (Two (2) pages).
(Continued)

*Primary Examiner* — Bernard Rojas
*Assistant Examiner* — Alexander Singh
(74) *Attorney, Agent, or Firm* — Crowell & Moring LLP

(57) ABSTRACT

A stator for an electric machine includes a cylindrical stator body having several stator slots. A first coil is inserted into the stator slots for a first phase, where the first coil has a first coil end on at least one face of the stator body. A second coil is inserted into the stator slots for a second phase, where the second coil has a second coil end on the at least one face of the stator body. A third coil may be inserted into the stator slots for a third phase, where the third coil has a third coil end on the at least one face of the stator body. The stator includes a molded body for receiving and electrically insulating the coil ends, where the molded body extends in a first ring area and a second ring area concentric with respect to the first ring area.

13 Claims, 3 Drawing Sheets

(51) Int. Cl.
*H02K 3/50* (2006.01)
*H02K 3/34* (2006.01)
*H02K 15/085* (2006.01)
*H02K 15/02* (2006.01)
*H02K 1/16* (2006.01)

(52) U.S. Cl.
CPC ......... *H02K 15/024* (2013.01); *H02K 15/085* (2013.01); *H02K 1/16* (2013.01); *H02K 3/345* (2013.01); *Y10T 29/49009* (2015.01)

(56) References Cited

U.S. PATENT DOCUMENTS

| | | | |
|---|---|---|---|
| 5,659,219 A * | 8/1997 | Momose | H02K 3/38 29/596 |
| 2007/0170792 A1 * | 7/2007 | Bott | H02K 3/522 310/71 |
| 2011/0012475 A1 * | 1/2011 | Mera | H02K 3/345 310/215 |
| 2011/0215662 A1 | 9/2011 | Lee et al. | |
| 2012/0274156 A1 | 11/2012 | Chamberlin et al. | |

FOREIGN PATENT DOCUMENTS

DE  10 2010 039 336 A1  2/2012
GB  2 088 648 A  6/1982

OTHER PUBLICATIONS

German Search Report dated Sep. 19, 2013, with Statement of Relevancy (Six (6) pages).

Chinese Office Action issued in Chinese counterpart application No. 201380053990.9 dated Sep. 13, 2016, with English translation (Fourteen (14) pages).

* cited by examiner

STATOR WITH PHASE INSULATION FOR AN ELECTRIC MACHINE AND PRODUCTION METHOD FOR SUCH A STATOR

CROSS REFERENCE TO RELATED APPLICATIONS

This application is a continuation of PCT International Application No. PCT/EP2013/073955, filed Nov. 15, 2013, which claims priority under 35 U.S.C. § 119 from German Patent Application No. 10 2012 223 668.6, filed Dec. 19, 2012, the entire disclosures of which are herein expressly incorporated by reference.

BACKGROUND AND SUMMARY OF THE INVENTION

The present invention relates to a stator for an electric machine as well as to a process for producing the stator. The stator is used particularly for an electric machine in a motor vehicle. The electric machine is preferably used for driving the motor vehicle.

The stator and the rotor are central components of an electric machine. Coils are placed in the stator for generating a rotating electromagnetic field, which drives the rotor. For a perfect functioning, the coils in the stator have to be electrically insulated with respect to one another. In the prior art, insulating papers, such as NOMEX paper flags, are used for this purpose. The insulation papers have to be manually placed between the coils. In addition to requiring physical effort, this process is very time-consuming particularly at the coil ends. In addition, as a result of the possible slipping of the insulation papers, considerable quality problems will occur during subsequent working steps, which require constant control and do not permit a fully automatic production process.

It is an object of the present invention to indicate a stator for an electric machine which, while the production and the assembly are cost-effective, provides an operationally secure insulation of the coil ends. Furthermore, it is an object of the present invention to indicate a method of producing a stator for an electric machine which, while the implementation is simple and process-reliable, permits an operationally secure insulation of the coil ends.

This object is achieved by means of the characteristics of the independent claims. The respective objects of the subclaims are advantageous further developments of the invention.

The object is therefore achieved by means of a stator for an electric machine. The stator comprises a cylindrical stator body having several stator slots. The stator body is produced of metal. At least three different coils for generating the electromagnetic field are situated in the stator slots. At least a first coil is provided for a first phase (U); at least a second coil is provided for a second phase (V); and at least a third coil is provided for a third phase (W). Each coil has at least one coil end at the frontal areas of the stator body. In order to insulate the individual coil ends at the respective frontal area with respect to another, a molded body is provided. In particular, one molded body respectively is provided at the two frontal areas of the stator body. The molded body is used for receiving and for electrically insulating the coil ends. For this purpose, the molded body is, for example, produced of plastic. The molded body extends in two mutually concentric ring areas. The coil end of the first coil is arranged in the first ring area. The coil end of the third coil is arranged in the second ring area. The coil end of the second coil is arranged in both ring areas. In particular, several first, second and third coils are provided. Correspondingly, there are several first, second and third coil ends. In particular, all first coil ends are arranged in the first ring area. All third coil ends are arranged in the second ring area. Correspondingly, all second coil ends are in each case arranged in the first and second ring area. The arrangement of the individual coil ends in two mutually concentric ring areas of the molded body permits a very space-saving and simultaneously secure insulation and arrangement of the coil ends.

A center axis is preferably defined at the cylindrical stator body. The center axis extends along a rotor axis of a rotor which is inserted in the stator. A radial direction is defined perpendicular to the center axis. A circumferential direction is defined around the center axis. The two ring areas of the molded body are preferably arranged concentrically with respect to the center axis. The two ring areas extend in the circumferential direction and in the radial direction. In particular, the first ring area is arranged outside the second ring area. Particularly preferably, an outside diameter of the second ring area corresponds to an inside diameter of the first ring area.

The molded body preferably has channel-shaped receiving devices for the respective coil ends. The channel-shaped receiving devices cover the respective coil end on a least three sides. Correspondingly, each receiving device has a floor. The floor extends in the radial and in the circumferential direction. Two mutually spaced side walls stand perpendicularly on the floor.

Slits are preferably formed in the channel-shaped receiving devices. These slits are aligned with the stator slots. As a result, it becomes possible to place the coils from stator slots through slits into the receiving devices.

Several coil ends of different coils of the same phase may also be placed into a single receiving device.

The first receiving devices for the first coil ends are aligned in a row along the first ring area. The third receiving devices for the third coil ends are aligned along the second ring area. The second receiving devices for the second coil ends each have a first channel-shaped section and a second channel-shaped section. The first channel-shaped section is situated in the first ring area. The second channel-shaped section is situated in the second ring area. The second receiving devices for the second coil ends therefore have a bend. This bend connects the two channel-shaped sections of the second receiving devices.

The molded body is preferably constructed of three parts. The molded body is composed of a first ring body, a second ring body and a third ring body. The individual ring bodies are each preferably produced in one piece. The individual ring bodies are, for example, produced as injection-molded parts. The first ring body preferably extends in the first ring area. The third ring body preferably extends in the second ring area. The second ring body has the second receiving devices for the second coil ends and therefore extends in both ring areas.

Furthermore, it is preferably provided that an insulation of the stator slots is integrated in the molded body. Thus, for example, projections of the molded body may engage in the stator slots and thereby insulate the stator slots with respect to the pulled-in coils.

Furthermore, the invention comprises a process for producing the just described stator. In the process, the coils are first wound outside the stator body and subsequently pulled into the stator slots and into the molded body. As an alternative, it is also provided to first place the molded body on the stator body and subsequently wind the coils directly into the stator slots and into the molded body. The advantageous further developments and subclaims described within the scope of the stator according to the invention are correspondingly advantageously applied to the process according to the invention.

Additional details, characteristics and advantages of the invention are indicated in the following description and the figures.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, an embodiment of a stator 1 will be described with respect to FIGS. 1 to 3.

Figure 1:
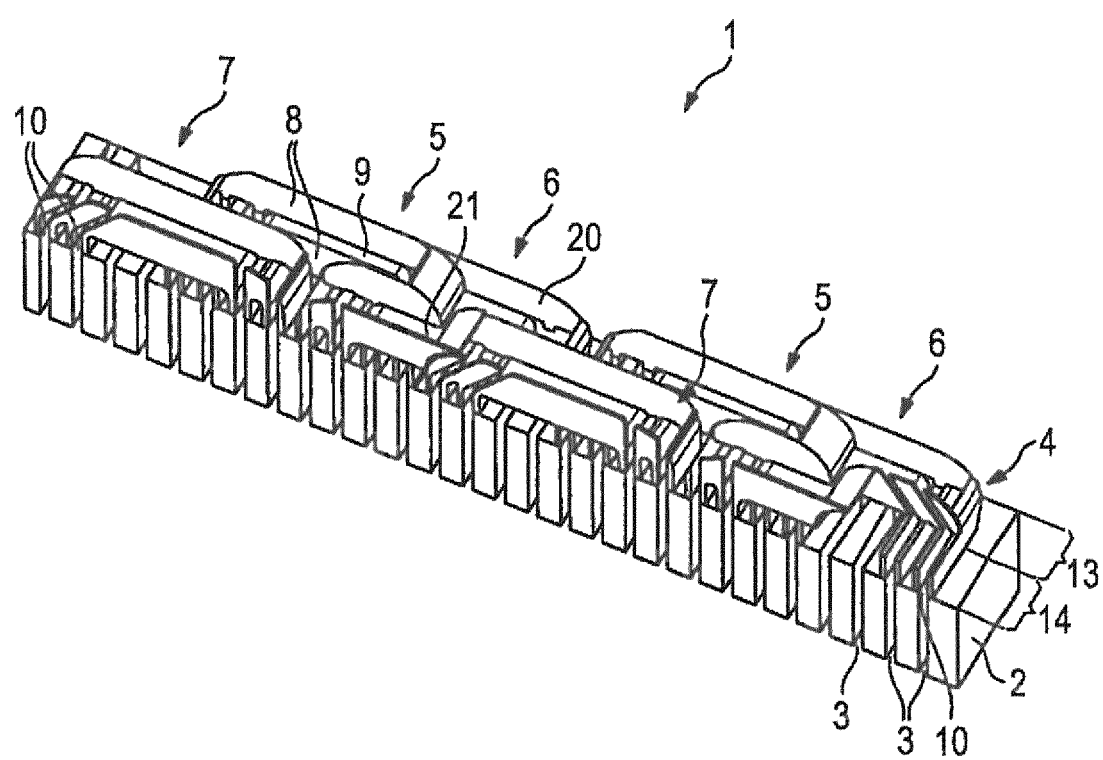
FIG. 1 is a view of a detail of a stator of the invention according to an embodiment.
Figure 2:
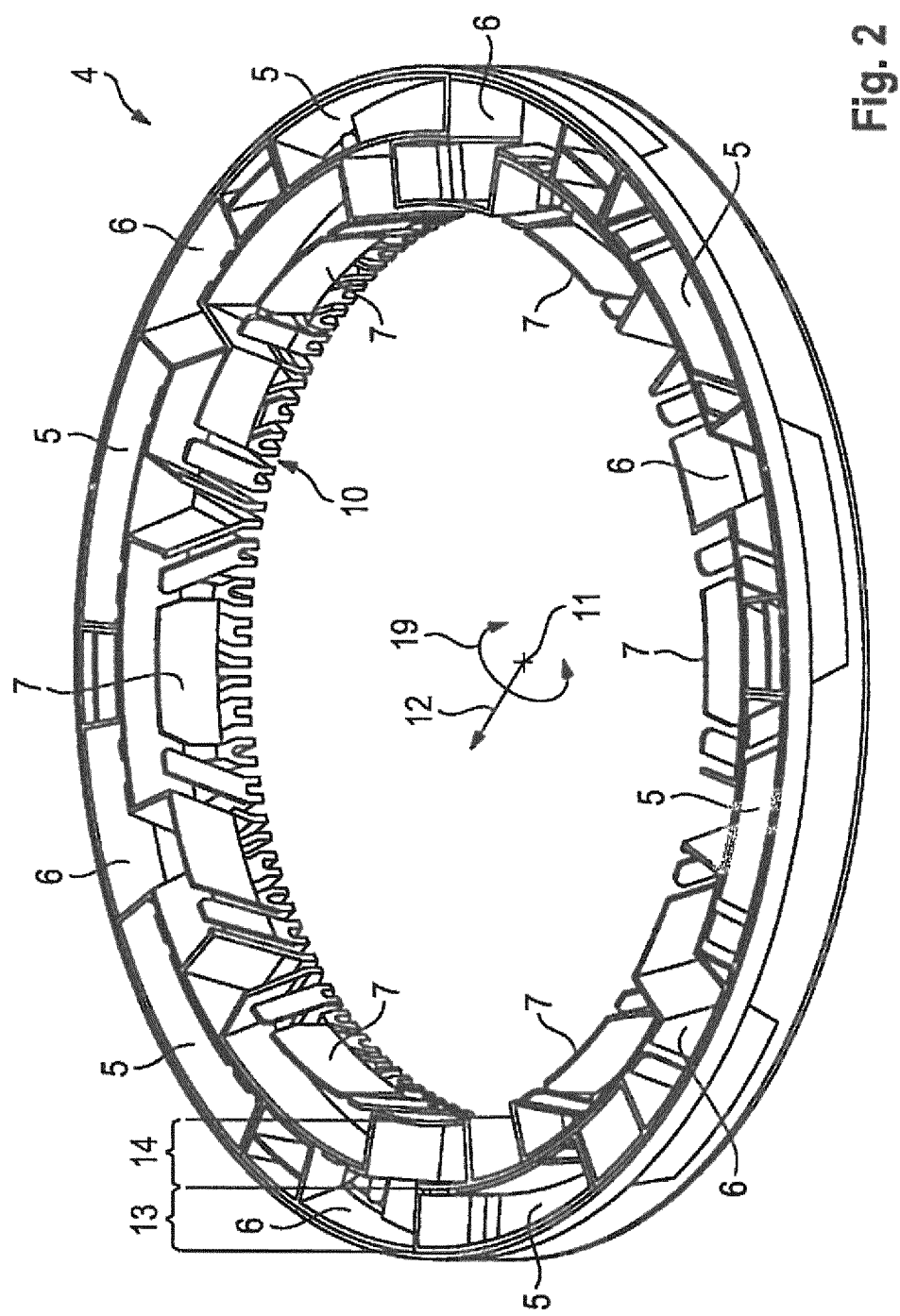
FIG. 2 is a view of a molded body of the stator of the invention according to the embodiment.

FIG. 1 illustrates only a detail of the stator 1. The stator 1 comprises a stator body 2 having several stator slots 3. A detail of a face of the stator body 2 is shown. A molded body 4 is disposed on this face. The entire molded body 4 is illustrated in FIG. 2. For simplifying the illustration, the stator body 2 and the molded body 4 are illustrated as a straight component in FIG. 1. The stator body 2 is actually cylindrical. The molded body 4 is ring-shaped corresponding to FIG. 2.

A center axis 11 is defined corresponding to the cylindrical shape of the stator body 2. The center axis 11 extends along a rotor axis of a rotor which is inserted into the stator 1. A radial direction 12 extends perpendicularly to the center axis 1. A circumferential direction 19 is defined around the center axis 11.

The molded body 4 extends over a first ring area 13 and a second ring area 14 concentric with respect to the first ring area 13. The two ring areas 13, 14 are concentric with respect to the center axis. The two ring areas 13, 14 extend in the radial direction 12 and in the circumferential direction 19. The first ring area 13 bounds on the second ring area 14 and is situated outside the second ring area 14.

The molded body 4 has six first channel-shaped receiving devices 5, six second channel-shaped receiving devices 6 and six third channel-shaped receiving devices 7. The first channel-shaped receiving devices 5 are arranged along the circumferential direction 19 on the first ring area 13. The third channel-shaped receiving devices 7 are arranged along the circumferential direction on the second ring area 14.

The third channel-shaped receiving devices 7 are arranged along the circumferential direction on two ring areas 13, 14 respectively. For this purpose, each third channel-shaped receiving device 7 is divided into a first section and into a second section 21. The first section 20 is situated in the first ring area 13. The second section 21 is situated in the second ring area 14.

As a result of the special further development of the second receiving devices 6, the first section 20 is in each case situated between two first receiving devices 5. The second section 21 is in each case situated between two third receiving devices 7.

The channel-shaped receiving devices 5, 6, 7 are each composed of a floor 9 and two mutually spaced side walls 8. The side walls 8 stand perpendicularly on the floor. Slits 10 are constructed in one of the side walls 8 and in the floor 9 respectively. The slits 10 are aligned with the stator slots 3 of the stator body 2.

Coils are pulled into the stator slots 3. For reasons of clarity, the coils are not illustrated in the figures. The respective coil ends are placed into the receiving devices 5, 6, 7 of the molded body 4 and are thereby insulated with respect to one another.

Figure 3:
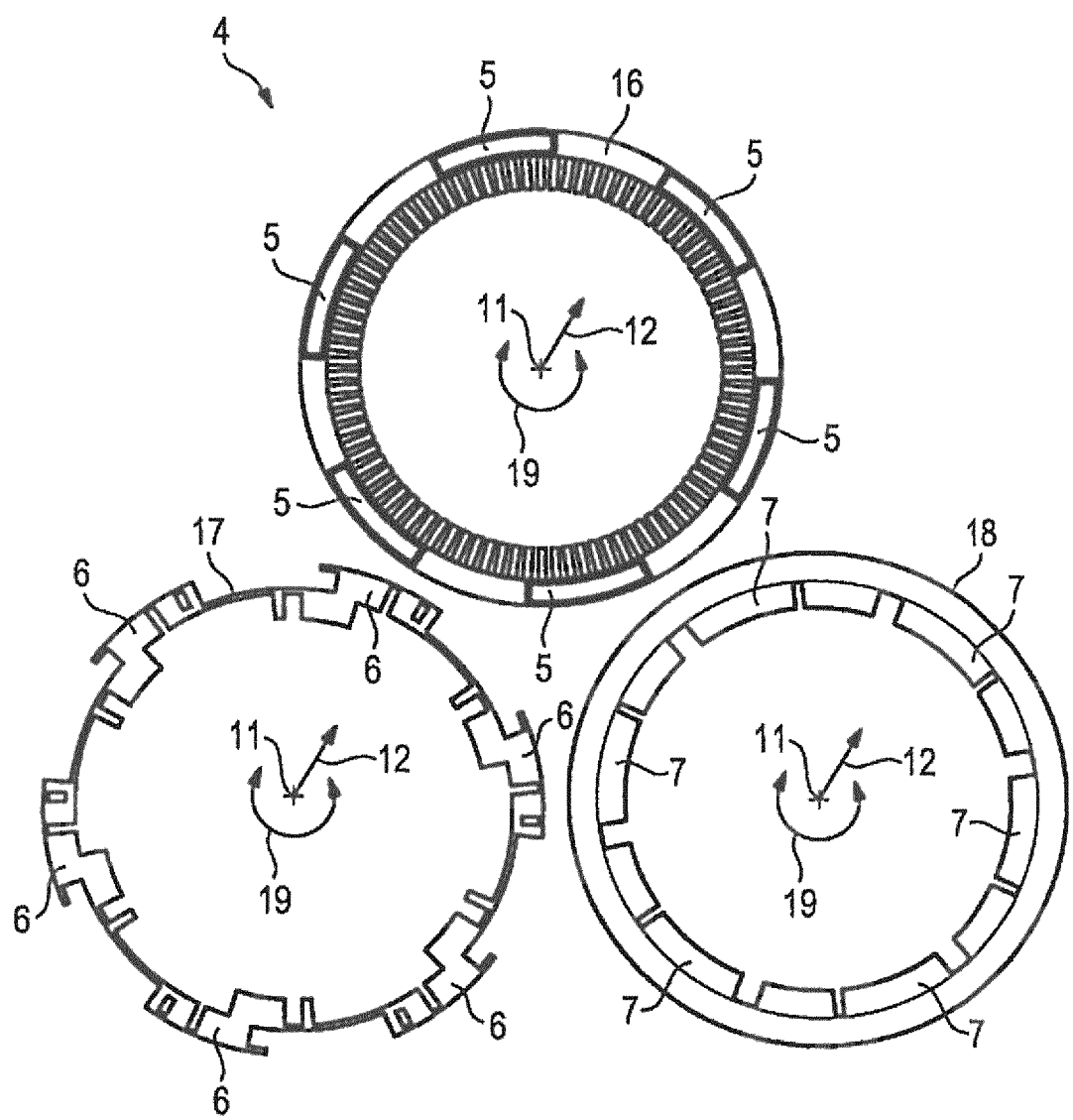
FIG. 3 is a view of the molded body of FIG. 2 in a disassembled state.

FIG. 3 illustrates the precise construction of the molded body 4. In the illustrated embodiment, the molded body 4 is fitted together of a first ring body 16, a second ring body 17 and a third ring body 18. The individual ring bodies 16, 17, 18 are fitted into one another, so that the molded body 4 is formed which is illustrated in FIG. 2. In particular, the ring bodies 16, 17, 18 are each produced in one piece as injection-molded parts.

The illustrated stator 1 with the molded body 4 permits an operationally reliable insulation of the coil ends and simultaneously a space-saving arrangement of the coil ends.

LIST OF REFERENCE NUMBERS

1 Stator
2 Stator body
3 Stator slots
4 Molded body
5 First channel-shaped receiving device
6 Second channel-shaped receiving device
7 Third channel-shaped receiving device
8 Two side walls
9 Floor
10 Slits
11 Center axis
12 Radial direction
13 First ring area
14 Second ring area
16 First ring body
17 Second ring body
18 Third ring body
19 Circumferential direction
20 First section
21 Second section The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stator for an electric machine, the stator comprising:
a cylindrical stator body having several stator slots;
at least one first coil inserted into the stator slots for a first phase, the first coil having a first coil end on at least one face of the stator body;
at least one second coil inserted into the stator slots for a second phase, the second coil having a second coil end on the at least one face of the stator body;
at least one third coil inserted into the stator slots for a third phase, the third coil having a third coil end on the at least one face of the stator body; and at least one molded body for receiving and electrically insulating the coil ends, the molded body extending in a first ring area and a second ring area concentric with respect to the first ring area, wherein, on the at least one face of the cylindrical stator body, each of the at least one first coil ends being arranged in only the first ring area, each of the at least one third coil ends being arranged in only the second ring area, and each of the at least one second coil having ends being arranged in the first and in the second ring area, wherein the molded body comprises three individual, one-piece ring bodies in the form of a first ring body, a second ring body and a third ring body.

2. The stator according to claim 1, wherein the two ring areas stand perpendicularly with respect to the center axis of the cylindrical stator body.

3. The stator according to claim 2, wherein the at least one channel-shaped receiving device for the at least one second coil end comprises a first channel-shaped section in the first ring area and a second channel-shaped section in the second ring area.

4. The stator according to claim 2, wherein the channel-shaped receiving devices each have, at their respective ends, at least one slit aligned with one of the stator slots.

5. The stator according to claim 1, wherein the at least one channel-shaped receiving device for the at least one second coil end comprises a first channel-shaped section in the first ring area and a second channel-shaped section in the second ring area.

6. The stator according to claim 5, wherein the channel-shaped receiving devices each have, at their respective ends, at least one slit aligned with one of the stator slots.

7. The stator according to claim 1, wherein the channel-shaped receiving devices each have, at their respective ends, at least one slit aligned with one of the stator slots.

8. The stator according to claim 1, wherein at least one of the first ring body, the second ring body, and the third ring body are produced as an injection-molded part.

9. The stator according to claim 1, wherein an insulation of the stator slots is integrated in the molded body.

10. The stator according to claim 1, wherein the first ring body, second ring body and third ring body are fitted into one another so as to form the molded body.

11. The stator according to claim 1, wherein first ring body extends in only the first ring area, the third ring body extends in only the second ring area, and the second ring body extends in both the first and second ring areas.

12. The stator according to claim 11, wherein the channel-shaped receiving devices comprises first receiving devices in which the at least one first coil ends are arranged, third receiving devices in which the at least one third coil ends are arranged, and second receiving devices in which each of the second coils ends are arranged.

13. The stator according to claim 1, wherein the molded body comprises channel-shaped receiving devices covering the respective coil ends on at least three sides.

* * * * *